US012769480B2

(12) United States Patent
Chen et al.

(10) Patent No.: US 12,769,480 B2
(45) Date of Patent: Oct. 20, 2026

(54) DATA WRITING METHOD, STORAGE DEVICE, AND COMPUTER-READABLE STORAGE DEVICE

(71) Applicant: Zhongshan Longsys Electronics Co., Ltd., Zhongshan (CN)

(72) Inventors: Pan Chen, Zhongshan (CN); Geng Liu, Zhongshan (CN)

(73) Assignee: Zhongshan Longsys Electronics Co., Ltd., Zhongshan (CN)

( * ) Notice: Subject to any disclaimer, the term of this patent is extended or adjusted under 35 U.S.C. 154(b) by 0 days.

(21) Appl. No.: 18/851,533

(22) PCT Filed: Aug. 15, 2022

(86) PCT No.: PCT/CN2022/112568

§ 371 (c)(1),
(2) Date: Sep. 26, 2024

(87) PCT Pub. No.: WO2024/031734

PCT Pub. Date: Feb. 15, 2024

(65) Prior Publication Data

US 2025/0208793 A1 Jun. 26, 2025

(30) Foreign Application Priority Data

Aug. 8, 2022 (CN) ......................... 202210946376.6

(51) Int. Cl.
*G06F 3/06* (2006.01)

(52) U.S. Cl.
CPC .......... *G06F 3/0659* (2013.01); *G06F 3/0616* (2013.01); *G06F 3/0634* (2013.01); *G06F 3/0679* (2013.01)

(58) Field of Classification Search
CPC .... G06F 3/0659; G06F 3/0616; G06F 3/0634; G06F 3/0679

(Continued)

(56) References Cited

U.S. PATENT DOCUMENTS

2009/0193184 A1* 7/2009 Yu ....................... G06F 12/0246 711/E12.001
2014/0359346 A1* 12/2014 Chen .................. G06F 11/1072 714/6.11

(Continued)

FOREIGN PATENT DOCUMENTS

CN 110737405 A 1/2020
CN 111164688 A 5/2020

(Continued)

OTHER PUBLICATIONS

International Search Report, International Application No. PCT/CN2022/112568, International mailed Dec. 22, 2022 (12 pages).

(Continued)

*Primary Examiner* — Gautam Sain

(57) ABSTRACT

The present application discloses a data writing method applied to a storage device. The method comprises: acquiring a first storage type of the storage device; writing first data to the storage device in a second storage type adapted to the first storage type of the storage device, wherein the first data is used for changing the storage type of the storage device into a third storage type; and in response to executing the first data, writing the data to the storage device in the third storage type. The present application further discloses the storage device and a computer readable storage device. By means of the method, the present application enables the storage device to support a new storage type.

20 Claims, 3 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 2016/0268000 | A1 | 9/2016 | Thompson et al. | |
| 2018/0260331 | A1 | 9/2018 | Kotte et al. | |
| 2019/0332327 | A1 | 10/2019 | Ji | |
| 2020/0210067 | A1* | 7/2020 | Cariello | G06F 3/0649 |
| 2022/0050627 | A1* | 2/2022 | Pratt | G06F 3/0659 |
| 2022/0365719 | A1* | 11/2022 | Sun | G06F 3/0659 |
| 2023/0106371 | A1* | 4/2023 | Linnen | G11C 16/349 711/154 |

FOREIGN PATENT DOCUMENTS

| | | | |
|---|---|---|---|
| CN | 111240578 | A | 6/2020 |
| CN | 112162695 | A | 1/2021 |
| CN | 112527204 | A | 3/2021 |
| CN | 113360092 | A | 9/2021 |
| CN | 113412465 | A | 9/2021 |

OTHER PUBLICATIONS

Chinese First Office Action, Chinese Application No. 202210946376.6, mailed Apr. 25, 2026 (23 pages).

* cited by examiner

| | Value | |
|---|---|---|
| First cache storage page (LSB) | 0 | 1 |
| Second cache storage page | 1 | 1 |
| Third cache storage page | 1 | 1 |
| Fourth cache storage page (MSB) | 1 | 1 |
| | 1110 | 1111 |

FIG. 7

| | Value | | | |
|---|---|---|---|---|
| First cache storage page (LSB) | 0 | 1 | 0 | 1 |
| Second cache storage page | 1 | 0 | 0 | 1 |
| Third cache storage page | 1 | 1 | 1 | 1 |
| Fourth cache storage page (MSB) | 1 | 1 | 1 | 1 |
| | 1110 | 1101 | 1100 | 1111 |

FIG. 8

DATA WRITING METHOD, STORAGE DEVICE, AND COMPUTER-READABLE STORAGE DEVICE

CROSS REFERENCE TO RELATED APPLICATIONS

The present disclosure a 35 U.S.C. § 371 National Phase conversion of International (PCT) Patent Application No. PCT/CN2022/112568 filed on Aug. 15, 2022, which claims priority to Chinese Patent Application No. 202210946376.6, the contents of which are incorporated herein by reference.

TECHNICAL FIELD

The present disclosure relates to the technical field of data storage, and in particular, to a data writing method, a storage device, and a computer-readable storage device.

BACKGROUND

In a storage device, a storage medium is required to save data. The commonly used storage media are RAM (Random Access Memory), ROM (Read-Only Memory), and Flash etc. Flash has many types of modes, such as SLC (Single-Level Cell), MLC (Multi-Level Cell), TLC (Triple-level Cell), and QLC (Quad-Level Cell) modes. However, due to the excessive voltage stratification for which data are saved in the flash when the flash is in the TLC or QLC mode, there easily occurs data loss due to power-down. Further, due to factors such as high and low temperatures and read/write lifetimes, flash in TLC or QLC mode is not suitable for storing firmware data. Data can be saved more stably as the flash is in SLC mode, but some host controllers do not support SLC mode in the flash of TLC or QLC mode. While pSLC mode can be applied to the flash of TLC or QLC mode, but as the pSLC mode is all used in the storage device, there has problems such as complicated operation and large overhead resources. How to solve the host controller not supporting SLC mode to improve the stability of Flash storage data have become the technical problems for those skilled in related art in this technical field.

SUMMARY OF THE DISCLOSURE

The present disclosure provides a data writing method, a storage device, and a computer-readable storage device to solve the host controller not supporting SLC mode to improve the stability of FLASH storage data.

To solve the above issues, a first aspect of the present disclosure provides a data writing method for a storage device, including obtaining a first storage mode of the storage device and writing a first data to the storage device in a second storage mode corresponding to the first storage mode of the storage device, wherein the first data is used to change the storage mode of the storage device to a third storage mode; and in response to the first data being executed, writing data to the storage device in the third storage mode.

To solve the above issues, a second aspect of the present disclosure provides a storage device including a memory and a processor. The memory is used to store data, and the data is capable of being executed by the processor to implement a method in the first aspect.

To solve the above issues, A third aspect of the present disclosure provides a computer-readable storage device. The program data is stored in the computer-readable device and is capable of being executed by a processor to implement a method in the first aspect.

The technical benefits of the present disclosure are that the first storage mode of the storage device is obtained, and thus the second storage mode that is corresponding to the first storage mode of the storage device can be determined. The first data is written to the storage device in the second storage mode. When the first data is executed, the storage mode of the storage device is changed as the third storage mode, enabling the storage device perform data writing in the third storage mode. By writing in the first data, the storage device is capable of supporting the third storage mode which is different to the first storage mode.

BRIEF DESCRIPTION OF THE DRAWINGS

To illustrate the technical solution more clearly in the embodiments of the present disclosure, accompanying drawings for the embodiments will be briefly described in the following. It is obvious that the accompanying drawings in the following description are only some of the embodiments of the present disclosure, and those skilled in the art may obtain other drawings based on these drawings without creative work.

FIG. 7 is a schematic diagram of another data writing process.

FIG. 8 is a schematic diagram of further another data writing process.

DETAILED DESCRIPTION

The technical solution in the embodiments of the present disclosure will be clearly and completely described below in conjunction with the accompanying drawings in the embodiments of the present disclosure. Obviously, the described embodiments are only some of the embodiments of the present disclosure and not all of them. Based on the embodiments in the present disclosure, all other embodiments obtained by those skilled in the art without creative work fall within the scope of protection of the present disclosure.

The terms "first", "second", etc. in the present disclosure are used to distinguish between different objects and are not intended to describe a particular order. Further, the terms "including" and "having", and any variations thereof, are intended to cover non-exclusive inclusion. For example, a process, method, system, product, or apparatus including a series of steps or units is not limited to the listed steps or units, but optionally also includes steps or units that are not listed, or optionally includes other steps or units that are inherent to the process, method, product, or apparatus.

Reference to "embodiments" in the present disclosure means that particular features, structures, or characteristics described in conjunction with the embodiments may be included in at least one embodiment of the present disclosure. The presence of the phrase at various points in the specification does not necessarily refer to the same embodiments or to separate or alternative embodiments that are mutually exclusive of other embodiments. It is understood by those skilled in the art, both explicitly and implicitly, that the embodiments described in the present disclosure may be combined with other embodiments.

Figure 1:
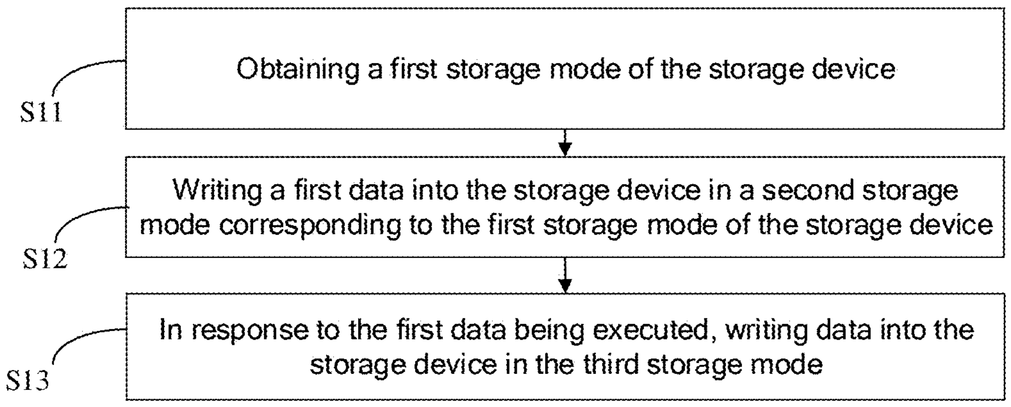
FIG. 1 is a schematic flow chart of a data writing method according to first embodiments of the present disclosure.

Referring to FIG. 1, FIG. 1 is a schematic flow chart of a data writing method according to first embodiments of the present disclosure. The method includes operations/actions in the following blocks.

At block S11, a first storage mode of a storage device is obtained.

A storage mode of the storage device is obtained, and the storage mode of the storage device is a raw storage mode supported by the host controller. The storage mode of the storage device typically includes modes such as SLC, MLC, TLC, QLC modes and the like.

At block S12, first data is written to the storage device in a second storage mode that is corresponding to the first storage mode of the storage device.

The second storage mode is a storage mode that may be implemented on the basis of the first storage mode. For example, when the first storage mode is QLC mode, the second storage mode may be pTLC (pseudo Triple-level Cell), pMLC (pseudo Multi-Level Cell), or pSLC (pseudo Single-Level Cell) mode. When the first storage mode is TLC mode, the second storage mode may be pMLC or pSLC mode. When the first storage mode is MLC, the second storage mode may be pSLC mode. Data states which can be stored in storage units in the second storage mode are less than that of the first storage mode. Sixteen data states can be stored in the storage units of the storage device in the QLC mode, eight data states can be stored in the storage units of the storage device in the TLC mode, four data states can be stored in the storage units of the storage device in the MLC mode, and two data states can be stored in the storage units of the storage device in the SLC mode. Correspondingly, eight data states can be stored in the storage units of the storage device in the pTLC mode, four data states can be stored in the storage units of the storage device in the pMLC mode, and two data states can be stored in the storage units of the storage device in the pSLC mode. A storage unit is a storage particle in the storage device, in which a voltage value is stored, and the voltage value is compared with a read voltage to indicate a data value stored by the storage particle. A storage device of the QLC mode has fifteen read voltages, a storage device of the TLC mode has seven read voltages, a storage device of the MLC mode has three read voltages, and a storage device of the SLC mode only has one read voltage.

The first data is used to change the storage mode of the storage device as a third storage mode. The first data is program data related to a storage mode of the storage device, which can be read and executed by the host controller to enable the host controller to support the storage mode corresponding to the first data, thereby changing the storage mode of the storage device.

At block S13, in response to the first data being executed, data is written to the storage device in the third storage mode.

After executing the first data, the storage device may support the third storage mode associated with the first data, thereby enabling subsequent data to be written and stored in the third storage mode. The third storage mode is also a raw storage mode supported by the host controller, which may include SLC mode, MLC mode, TLC mode and the like. For example, when the first storage mode is QLC mode, the third storage mode may be SLC mode, MLC mode or the like, and when the first storage mode is TLC mode, the third storage mode may be SLC mode, MLC mode or the like.

In the selection process, the number of data states that can be stored in the storage units of the selected second storage mode is less than that of the first storage mode. Since the number of data states that can be stored in the storage units of the second storage mode is less, which means that there are less read voltages and the read voltages are distributed more widely, the storage units of the second storage mode can reduce the impact of power loss on its own stored data. Similarly, the number of the data states that can be stored in the storage units of the third storage mode is also less than that of the first storage mode, and thus the storage units of the third storage mode can reduce the impact of power loss on its own stored data and improve the stability of the data storage.

In the data writing method, the first storage mode of the storage device is obtained, and thus the second storage mode that is corresponding to the first storage mode of the storage device can be determined. The first data is written to the storage device in the second storage mode. When the first data is executed, the storage mode of the storage device is changed as the third storage mode, enabling the storage device perform data writing in the third storage mode. By writing in the first data, the storage device is capable of supporting the third storage mode which is different to the first storage mode. Moreover, since the numbers of data states that can be stored in the storage units of both the second storage mode and the third storage mode are less than that of the first storage mode, the storage units of the second storage mode and storage units of the third storage mode can reduce the impact of power-down on data stored in the storage units, and thus improve the stability of data storage.

Figure 2:
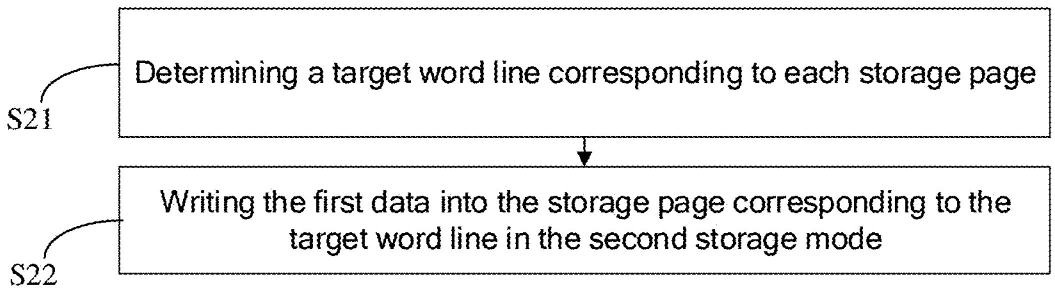
FIG. 2 is a schematic flow chart of a data writing method according to second embodiments of the present disclosure.

Referring to FIG. 2, FIG. 2 is a schematic flow chart of a data writing method according to second embodiments of the present disclosure, which is further expanded from operations/actions at block S21. The method includes operations/actions in the following blocks.

At block S21, a target word line is determined.

The storage device includes a plurality of storage blocks. Each storage block includes a plurality of storage pages. Each storage page corresponds to one word line. A word line is used to select a corresponding storage page.

Generally, the amount of the first data used to change the storage mode of the storage device may not occupy the amount of data in the entire storage block, while the pseudo-storage utilizing the second storage mode occupies more consumed resources than that of the raw storage mode. Therefore, in order to minimize resource overhead of the host controller, only a part of storage pages are selected for storing the first data in the second storage mode, rather than an entire storage block. Word lines corresponding to storage pages for writing the first data is target word lines.

At block S22, the first data is written to a storage page corresponding to the target word line in the second storage mode.

After the storage pages to which the first data is written are determined, the writing operation is performed in the second storage mode.

By determining the amount of the first data to be written, the required amount of storage space is determined, thus corresponding storage pages are determined, and corresponding target word lines are selected. In order to minimize occupancy consumption problem when the second storage mode is used, only the first data necessary for changing the storage mode is firstly written to the storage device in the second storage mode, so that the remaining storage space can be written in the third storage mode obtained by executing the first data.

Figure 3:
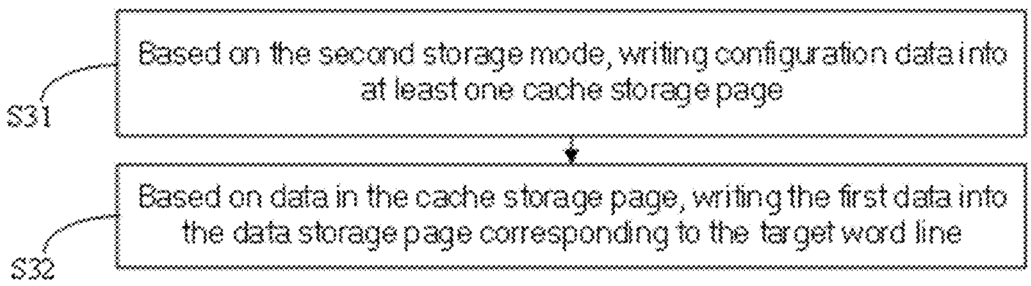
FIG. 3 is a schematic flow chart of a data writing method according to third embodiments of the present disclosure.

Referring to FIG. 3, FIG. 3 is a schematic flow chart of a data writing method according to third embodiments of the present disclosure, which is further expanded from operations/actions at block S22. The method includes operations/actions in the following blocks.

At block 31, configuration data is written into at least one cache storage page in the second storage mode.

Figure 4:
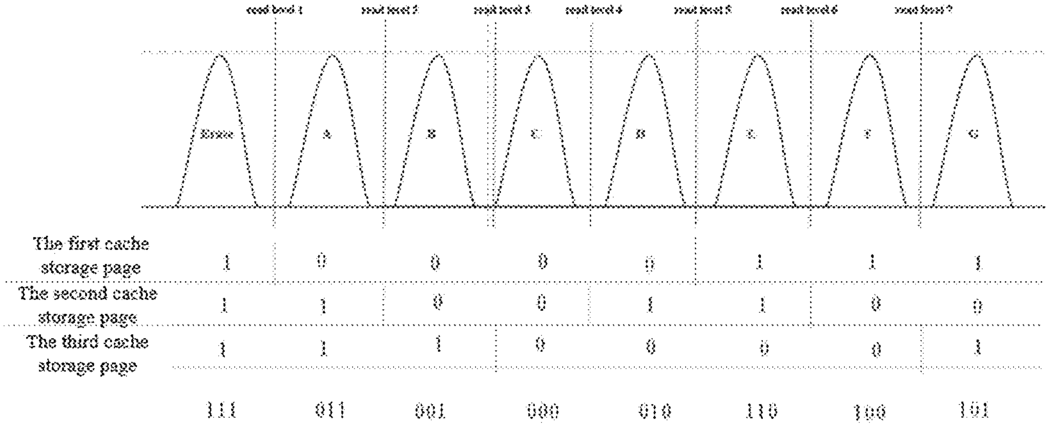
FIG. 4 is a schematic diagram of a data writing process.

The second storage mode is a pseudo-storage mode, which is a storage mode generated based on a writing principle of the first storage mode. In a process of data writing in the raw storage mode which is the first storage mode, when the storage mode is MLC, TLC, or QLC mode, of which a storage unit is capable of storing more than two data states, data writing is needed to be performed through cache storage pages. Taking a storage unit of the TLC mode as an example, the storage unit of the TLC mode may store eight data states. When data writing is performed through three levels of cache storage pages in the storage unit of the TLC mode, and each level of cache storage page has different writing voltages. As shown in FIG. 4, the writing mode of the storage unit is 2-3-2 mode. Firstly, readlevel1 and realevel5 are used for writing, and written data is stored in a first cache storage page, in which a data state of 101 is written from left to right and the written data is data in the lowest bit. Then, readlevel2, readlevel4, and readlevel6 are used for writing, and written data is stored to a second cache storage page, in which a data state of 10101 is written from left to right and the written data is data in the middle bits. Finally, readlevel3 and readlevel7 are used for writing, and written data is stored in a third cache storage page, in which the written data is data in the highest bit. The obtained data are 111, 110, 100, 000, 010, 011, 001, 101 in order, which are the eight data states that can be stored. Finally, all the data are stored in the data storage page together.

There are four cache storage pages in a storage device of the QLC mode. There are two cache storage pages in a storage device of the MLC mode. Write voltages of the cache storage pages are set according to an actual situation.

In some embodiments, referring to FIG. 7, when the first storage mode of the storage device is QLC mode. A storage block in the storage device has four corresponding cache storage pages, which are a first cache storage page, a second cache storage page, a third cache storage page, and a fourth cache storage page. The second storage mode corresponding to the first storage mode is selected to be pSLC mode. Storage units of pSLC mode can only store two data states, and thus the original sixteen data states of the QLC need to be reduced to two data states. Therefore, only one cache storage page is retained and the cache storage page has one write voltage. Configuration data are written into all the other three cache storage pages. The written configuration data is of the same kind, either 0 or 1. For example, what written in the first cache storage page is data in the lowest bit, which includes two states 0 and 1, while 1 is written in all the second, third and fourth cache storage pages, and thus, the finally-obtained data states only include 1110 and 1111.

In some embodiments, referring to FIG. 8, when the first storage mode of the storage device is QLC mode. A storage block in the storage device has four corresponding cache storage pages, which are a first cache storage page, a second cache storage page, a third cache storage page, and a fourth cache storage page. The second storage mode corresponding to the first storage mode is selected to be pMLC mode. Storage units of the pMLC mode can only store four data states, and thus the original sixteen data states of the QLC mode need to be reduced to four data states. Therefore, two cache storage pages are retained, which have three write voltages in total. Configuration data are written into the other two cache storage pages. The written configuration data is of the same kind, either 0 or 1. For example, what written in the first cache storage page is data in the lowest bit, which includes 0 and 1 states, while what written in the second cache storage page is data in the second lowest bit, which includes 0 and 1 states, 1 is written in both the third and fourth cache storage pages, and thus, the finally-obtained data states only include 1110, 1111, 1100, and 1101.

In some embodiments, when the first storage mode of the storage device is TLC mode. A storage block in the storage device has three corresponding cache storage pages, which are a first cache storage page, a second cache storage page, and a third cache storage page. The second storage mode corresponding to the first storage mode is selected to be pSLC mode. Storage units of pSLC mode can only store two data states, and thus the original eight data states of the TLC mode need to be reduced to two data states. Therefore, only one cache storage page is retained and that cache storage page has one write voltage. Configuration data is written in the other two cache storage pages. The written configuration data is of the same kind, either 0 or 1. For example, what written in the first cache storage page is data in the lowest bit, which includes two states 0 and 1, while 1 is written in both the third and fourth cache storage pages, and thus the finally-obtained data states only include 110 and 111.

In some embodiments, when the first storage mode of the storage device is TLC mode. A storage block in the storage device has three corresponding cache storage pages, which are a first cache storage page, a second cache storage page, and a third cache storage page. The second storage mode corresponding to the first storage mode is selected to be pMLC mode. Storage units of pMLC mode can only store four data states, and thus the original eight data states of the TLC mode need to be reduced to four data states. Therefore, two cache storage pages are retained, which have three write voltages in total. Configuration data is written in the other one cache storage page. The written configuration data is of the same kind, either 0 or 1. For example, what written in the first and second cache storage pages is data in the lowest bit and data in the second lowest bit, which include two states 0 and 1, while 1 is written in the third cache storage page, and thus, the finally-obtained data states only include 110, 111, 100, 101.

In some embodiments, when the first storage mode of the storage device is MLC mode. A storage block in the storage device has two corresponding cache storage pages, which are a first cache storage page and a second cache storage page. The second storage mode corresponding to the first storage mode is selected to be pSLC mode. Storage units of the pSLC mode can only store two data states, and thus the original four data states of the MLC mode need to be reduced to two data states. Therefore, only one cache storage page is retained, which has 1 write voltage. Configuration data is written in the other one cache storage page. The written configuration data is of the same kind, either 0 or 1. For example, what written in the first cache storage page is data in the lowest bit, which includes two states 0 and 1, while 1 is written in the second cache storage page, and thus, the finally-obtained data states include only 11 and 10.

The first cache storage page, the second cache storage page, and the like described in the above embodiments do not indicate their positional order relationship, but only indicate that they are different cache storage pages.

At block S32, the first data is written into a data storage page corresponding to the target word line, based on data in the cache storage page.

The cache storage pages which need to be configured are determined based on the selected second storage mode and the acquired first storage mode. After the configuration is completed, the first data is written and stored based on the data states that can be obtained by the storage unit.

It may be contemplated that in other embodiments, when the first storage mode is QLC mode, the selected second storage mode corresponding to the first storage mode may be pTLC mode, of which implementation refers to the above embodiments.

Since the first data has not yet been written to the storage device, the storage device is not yet capable of supporting the data writing in the third storage mode. Since data stability is not high, and stored data loss easily occurs due to the impact of power-down when the first storage mode is in QLC or TLC. Thus, a pseudo-storage mode corresponding to the first storage mode is used as the second storage mode for data writing to ensure data stability of the first data. The storage unit of the second storage mode has less data states and less read voltages, and thus a distance between read voltages is wider, so that the impact of power-down is reduced and data loss does not occur easily, thereby ensuring data stability.

Figure 5:
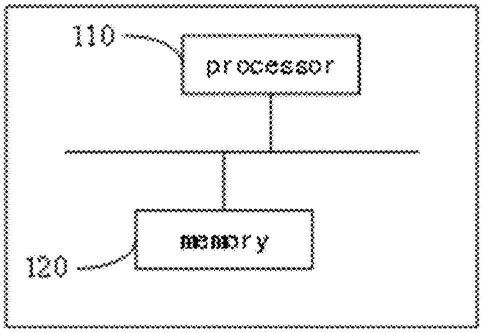
FIG. 5 is a schematic diagram of a device according to some embodiments of the present disclosure.

As shown in FIG. 5, FIG. 5 is a schematic diagram of a device according to some embodiments of the present disclosure.

The device includes a processor 110 and a memory 120.

The processor 110 controls the operation of the device, and the processor 110 may also be referred to as a central processing unit (CPU). The processor 110 may be an integrated circuit chip with signal sequence processing capacity. The processor 110 may also be a general-purpose processor, a digital signal sequence processor (DSP), an application-specific integrated circuit (ASIC), a field programmable gate array (FPGA) or other programmable logic device, a discrete gate or transistor logic device, a discrete hardware component. The general-purpose processor may be a microprocessor or the processor may also be any conventional processor, etc.

The memory 120 stores instructions and data necessary for the processor 110 to operate.

The processor 110 is configured to execute instructions to implement the method provided by any of the embodiments and possible combinations of the methods described earlier in the present disclosure.

Figure 6:
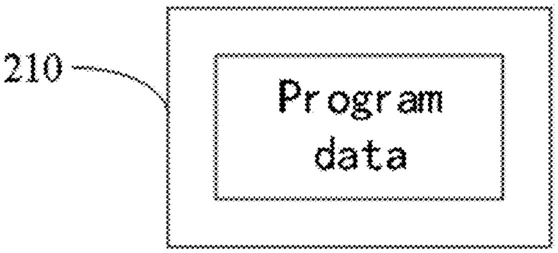
FIG. 6 is a schematic diagram of a computer-readable storage medium according to some embodiments of the present disclosure.

As shown in FIG. 6, FIG. 6 is a schematic diagram of a computer-readable storage medium according to some embodiments of the present disclosure.

Some embodiments of the readable storage device of the present disclosure include a memory 210 which stores program data. When the program data is executed, any one of the methods in the present disclosure and possible combinations of the methods are implemented.

The memory 210 may include a medium such as a USB flash drive, a removable hard disk, a read-only memory (ROM), a random-access memory (RAM), a disk or a CD-ROM, etc., which can store program instructions, or it may also be a server that stores the program instructions, and which can send stored program instructions to other devices to run, or it may also run the stored program instructions on its own. The server may send the stored program instructions to other devices for operation, or may run the stored program instructions on its own.

In summary, the first storage mode of the storage device is obtained, and thus the second storage mode that is corresponding to the first storage mode of the storage device can be determined. The first data is written to the storage device in the second storage mode. When the first data is executed, the storage mode of the storage device is changed as the third storage mode, enabling the storage device perform data writing in the third storage mode. By writing in the first data, the storage device is capable of supporting the third storage mode which is different to the first storage mode. Moreover, since the numbers of data states that can be stored in the storage units of both the second storage mode and the third storage mode are less than that of the first storage mode, the storage units of the second storage mode and storage units of the third storage mode can reduce the impact of power-down on data stored in the storage units, and thus improve the stability of data storage.

In some embodiments of the present disclosure, it should be understood that, the disclosed methods, as well as the apparatuses, can be realized in other ways. For example, the above-described implementations of the apparatus are merely schematic. For example, the division of the described modules or units is merely a logical functional division, and the actual implementation may be divided in other ways. For example, a plurality of units or components may be combined or may be integrated into another system, or some features may be ignored, or not implemented.

The units illustrated as separated components may or may not be physically separated, and components shown as units may or may not be physical units. That is, they may be located at one place, or they may be distributed to a plurality of network units. Some or all of these units may be selected to fulfil the purpose of the embodiments in the present disclosure according to actual needs.

In addition, the functional units in some embodiments of the present disclosure may be integrated in a single processing unit, or the individual units may be physically present separately, or two or more units may be integrated in a single unit. The above integrated units may be implemented either in the form of hardware or in the form of software functional units.

The units integrated in other embodiments described above may be stored in a computer-readable storage medium if they are implemented in the form of a software function unit and sold or used as a separate product. Based on this understanding, the technical solution of the present disclosure may be embodied in the form of a software product that is essentially or in part a contribution to the related art, or all or part of the technical solution may be embodied in the form of a software product that is stored in a storage medium, including a plurality of instructions to enable a computer device (which may be a personal computer, a server or a network device, etc.) or a process to execute all or part of the steps of the method described in some embodiments of the present disclosure. The aforementioned storage media include a USB flash drive, a removable hard disk, a read-only memory (ROM), a random access memory (RAM), a magnetic disk, or a CD-ROM, and other media that can store program code.

The above embodiments are only embodiments of the present disclosure, which are not intended to limit the scope of the patent of the present disclosure. Any equivalent structure or equivalent process transformation utilizing the contents of the specification of the present disclosure and the accompanying drawings, or directly or indirectly applying them in other related technical fields, all fall within the scope of patent protection of the present disclosure in the same way.

What is claimed is:

1. A data writing method for a storage device, comprising:

obtaining a first storage mode of the storage device;

writing first data into the storage device in a second storage mode corresponding to the first storage mode of the storage device, wherein the first data is program data related to storage modes of the storage device and is capable of being read and executed by a host controller of the storage device to enable the host controller to support a storage mode corresponding to the first data, for changing the first storage mode of the storage device to a third storage mode, and the third storage mode is supported in the storage device; and writing data into the storage device in the third storage mode in response to the first data being executed.

2. The method according to claim 1, wherein the storage device comprises a storage block, the storage block comprises a plurality of data storage pages, and each of the data storage pages corresponds to a word line;

the writing the first data into the storage device in the second storage mode corresponding to the first storage mode of the storage device comprises:

determining at least one target word line from word lines of the data storage pages;

writing the first data into at least one data storage page corresponding to the at least one target word line in the second storage mode.

3. The method according to claim 2, wherein the second storage mode is based on the first storage mode;

a number of data states stored in the storage device corresponding to the second storage mode is less than that corresponding to the first storage mode;

a number of data states stored in the storage device corresponding to the third storage mode is less than that corresponding to the first storage mode.

4. The method according to claim 3, wherein the storage block further comprises at least one cache storage page;

the writing the first data into at least one data storage page corresponding to the at least one target word line in the second storage mode comprises:

writing configuration data into the at least one cache storage page in the second storage mode;

writing the first data into the at least one data storage page corresponding to the at least one target word line based on the configuration data in the at least one cache storage page.

5. The method according to claim 4, wherein the first storage mode is a QLC (Quad-Level Cell) mode, the second storage mode is a pSLC (pseudo Single-Level Cell) mode, and the at least one cache storage page comprises a plurality of cache storage pages corresponding to different bit levels of a quad-level cell (QLC), wherein the plurality of cache storage pages includes a first cache storage page for storing least significant bit (LSB) data, a second cache storage page, a third cache storage page, and a fourth cache storage page for storing most significant bit (MSB) data;

the writing configuration data into the at least one cache storage page in the second storage mode comprises:

writing the configuration data into the first cache storage page, the second cache storage page, and the third cache storage page in the second storage mode.

6. The method according to claim 4, wherein the first storage mode is a QLC mode, the second storage mode is a pMLC (pseudo Multi-Level Cell) mode, and the at least one cache storage page comprises a plurality of cache storage pages corresponding to different bit levels of a quad-level cell (QLC), wherein the plurality of cache storage pages includes a first cache storage page for storing least significant bit (LSB) data, a second cache storage page, a third cache storage page, and a fourth cache storage page for storing most significant bit (MSB) data;

the writing configuration data into the at least one cache storage page in the second storage mode comprises:

writing the configuration data into the first cache storage page and the second cache storage page in the second storage mode.

7. The method according to claim 4, wherein the first storage mode is a TLC (Triple-level Cell) mode, the second storage mode is a pSLC (pseudo Single-Level Cell) mode, and the at least one cache storage page comprises a first cache storage page, a second cache storage page, and a third cache storage page;

the writing configuration data into the at least one cache storage page in the second storage mode comprises:

writing the configuration data into the first cache storage page and the second cache storage page in the second storage mode.

8. The method according to claim 4, wherein the first storage mode is a TLC (Triple-level Cell) mode, the second storage mode is a pMLC (pseudo Multi-Level Cell) mode, and the at least one cache storage page comprises a first cache storage page, a second cache storage page, and a third cache storage page;

the writing configuration data into the at least one cache storage page in the second storage mode comprises:

writing the configuration data into the first cache storage page in the second storage mode.

9. The method according to claim 4, wherein the first storage mode is a MLC (Multi-Level Cell) mode, the second storage mode is a pSLC (pseudo Single-Level Cell) mode, and the at least one cache storage page comprises a first cache storage page and a second cache storage page;

the writing configuration data into the at least one cache storage page in the second storage mode comprises:

writing the configuration data into the first cache storage page in the second storage mode.

10. A storage device, comprising a memory and a processor, wherein the memory is configured to store data, and the data is capable of being executed by the processor to implement a method, comprising:

obtaining a first storage mode of a storage device;

writing first data into the storage device in a second storage mode corresponding to the first storage mode of the storage device, wherein the first data is program data related to storage modes of the storage device and is capable of being read and executed by a host controller of the storage device to enable the host controller to support a storage mode corresponding to the first data, for changing the first storage mode of the storage device to a third storage mode, and the third storage mode is supported in the storage device; and writing data into the storage device in the third storage mode in response to the first data being executed.

11. The device according to claim 10, wherein the storage device comprises a storage block, the storage block comprises a plurality of data storage pages, and each of the data storage pages corresponds to a word line;

the first data is written into at least one data storage page corresponding to at least one word line of the data storage pages in the second storage mode.

12. The device according to claim 11, wherein the second storage mode is based on the first storage mode;

a number of data states stored in the storage device corresponding to the second storage mode is less than that corresponding to the first storage mode;

a number of data states stored in the storage device corresponding to the third storage mode is less than that corresponding to the first storage mode.

13. The device according to claim 12, wherein the storage block further comprises at least one cache storage page;

writing the first data into the at least one data storage page comprises:

writing configuration data into the at least one cache storage page in the second storage mode;

writing the first data into the at least one data storage page corresponding to the at least one target word line based on the configuration data in the at least one cache storage page.

14. The device according to claim 13, wherein the first storage mode is a QLC (Quad-Level Cell) mode, the second storage mode is a pSLC (pseudo Single-Level Cell) mode, and the at least one cache storage page comprises a plurality of cache storage pages corresponding to different bit levels of a quad-level cell (QLC), wherein the plurality of cache storage pages includes a first cache storage page for storing least significant bit (LSB) data, a second cache storage page, a third cache storage page, and a fourth cache storage page for storing most significant bit (MSB) data;

the writing configuration data into the at least one cache storage page in the second storage mode comprises:

writing the configuration data into the first cache storage page, the second cache storage page, and the third cache storage page in the second storage mode.

15. The device according to claim 13, wherein the first storage mode is a QLC mode, the second storage mode is a pMLC (pseudo Multi-Level Cell) mode, and the at least one cache storage page comprises a plurality of cache storage pages corresponding to different bit levels of a quad-level cell (QLC), wherein the plurality of cache storage pages includes a first cache storage page for storing least significant bit (LSB) data, a second cache storage page, a third cache storage page, and a fourth cache storage page for storing most significant bit (MSB) data;

the writing configuration data into the at least one cache storage page in the second storage mode comprises:

writing the configuration data into the first cache storage page and the second cache storage page in the second storage mode.

16. The device according to claim 13, wherein the first storage mode is a TLC (Triple-level Cell) mode, the second storage mode is a pSLC (pseudo Single-Level Cell) mode, and the at least one cache storage page comprises a first cache storage page, a second cache storage page, and a third cache storage page;

the writing configuration data into the at least one cache storage page in the second storage mode comprises:

writing the configuration data into the first cache storage page and the second cache storage page in the second storage mode.

17. The device according to claim 13, wherein the first storage mode is a TLC (Triple-level Cell) mode, the second storage mode is a pMLC (pseudo Multi-Level Cell) mode, and the at least one cache storage page comprises a first cache storage page, a second cache storage page, and a third cache storage page;

the writing configuration data into the at least one cache storage page in the second storage mode comprises:

writing the configuration data into the first cache storage page in the second storage mode.

18. The device according to claim 13, wherein the first storage mode is a MLC (Multi-Level Cell) mode, the second storage mode is a pSLC (pseudo Single-Level Cell) mode, and the at least one cache storage page comprises a first cache storage page and a second cache storage page;

the writing configuration data into the at least one cache storage page in the second storage mode comprises:

writing the configuration data into the first cache storage page in the second storage mode.

19. A non-transitory computer-readable storage medium, applied for a storage device, storing program data that is capable of being executed by a processor of the storage device to implement a method, comprising:

obtaining a first storage mode of the storage device;

writing first data into the storage device in a second storage mode corresponding to the first storage mode of the storage device, wherein the first data is program data related to storage modes of the storage device and is capable of being read and executed by a host controller of the storage device to enable the host controller to support a storage mode corresponding to the first data, for changing the first storage mode of the storage device to a third storage mode, and the third storage mode is supported in the storage device; and writing data into the storage device in the third storage mode in response to the first data being executed.

20. The non-transitory computer-readable storage medium according to claim 19, wherein the second storage mode is based on the first storage mode;

a number of data states stored in the storage device corresponding to the second storage mode is less than that corresponding to the first storage mode;

a number of data states stored in the storage device corresponding to the third storage mode is less than that corresponding to the first storage mode.

* * * * *